US009359235B2

(12) United States Patent
Nielsen et al.

(10) Patent No.: US 9,359,235 B2
(45) Date of Patent: Jun. 7, 2016

(54) METHOD AND A SYSTEM FOR OUT-COMPETING GLYCOGEN-ACCUMULATING ORGANISMS IN A SUBSTANCE

(75) Inventors: Per Halkjær Nielsen, Gistrup (DK); Jes Vollertsen, Dybvad (DK); Kim Helleshøj Sørensen, Jouy sur Morin (FR)

(73) Assignee: VEOLIA WATER SOLUTIONS & TECHNOLOGIES SUPPORT, Saint-Maurice (FR)

( * ) Notice: Subject to any disclaimer, the term of this patent is extended or adjusted under 35 U.S.C. 154(b) by 315 days.

(21) Appl. No.: 14/235,562

(22) PCT Filed: Jul. 27, 2012

(86) PCT No.: PCT/EP2012/003197
§ 371 (c)(1),
(2), (4) Date: Jun. 27, 2014

(87) PCT Pub. No.: WO2013/017243
PCT Pub. Date: Feb. 7, 2013

(65) Prior Publication Data
US 2014/0319053 A1    Oct. 30, 2014

(30) Foreign Application Priority Data

Jul. 29, 2011 (EP) ..................................... 11305996
May 23, 2012 (EP) ..................................... 12169112

(51) Int. Cl.
*C02F 3/30* (2006.01)
*C02F 3/00* (2006.01)
*C02F 3/34* (2006.01)

(52) U.S. Cl.
CPC . *C02F 3/006* (2013.01); *C02F 3/30* (2013.01); *C02F 3/308* (2013.01); *C02F 3/34* (2013.01); *C02F 2209/02* (2013.01)

(58) Field of Classification Search
CPC ............ C02F 3/006; C02F 3/308; C02F 3/34; C02F 3/30; C02F 2209/02
USPC .......... 210/605, 614, 621, 623, 138, 143, 149
See application file for complete search history.

(56) References Cited

U.S. PATENT DOCUMENTS 7,438,813 B1    10/2008 Pedros
2008/0110825 A1    5/2008 Yamaguchi

*Primary Examiner* — Fred Prince
(74) *Attorney, Agent, or Firm* — Coats and Bennett PLLC

(57) ABSTRACT

A method and a substance treatment system for reducing a ratio of Glycogen-Accumulating Organisms relative to the total amount of Glycogen-Accumulating Organisms and Polyphosphate-Accumulating Organisms in a substance.
A controller for controlling a waste water treatment system in accordance with the method. Use of the method according to control a waste water treatment system in accordance with the method.

14 Claims, 3 Drawing Sheets

US 9,359,235 B2

METHOD AND A SYSTEM FOR OUT-COMPETING GLYCOGEN-ACCUMULATING ORGANISMS IN A SUBSTANCE

This application is a U.S. National Stage Application of PCT Application No. PCT/EP2012/003197, with an international filing date of 27 Jul. 2012. Applicant claims priority based on European Patent Application No. 12169112.5 filed 23 May 2012 and European Patent Application No. 11305996.8 filed 29 Jul. 2011. The subject matter of these applications is incorporated herein.

FIELD OF THE INVENTION

The present invention relates to a method of reducing a ratio of Glycogen-Accumulating Organisms relative to the total amount of Glycogen-Accumulating Organisms and Polyphosphate-Accumulating Organisms in a substance. Moreover the present invention relates to a waste water treatment system for reducing a percentage of Glycogen-Accumulating Organisms in a substance comprising Glycogen-Accumulating Organisms and Polyphosphate-Accumulating Organisms. Furthermore, the present invention relates to a controller for controlling a waste water treatment system in accordance with the method of reducing a ratio of Glycogen-Accumulating Organisms relative to the total amount of Glycogen-Accumulating Organisms and Polyphosphate-Accumulating Organisms in a substance. Moreover, the present invention relates to use of the method according to control a waste water treatment system in accordance with the method of reducing a ratio of Glycogen-Accumulating Organisms relative to the total amount of Glycogen-Accumulating Organisms and Polyphosphate-Accumulating Organisms in a substance.

BACKGROUND OF THE INVENTION

Waste water treatment plants are used to treat waste water such that undesired objects, particles, organic substances, chemicals etc. are removed from the waste water prior to its emission into nature. One unwanted chemical is phosphate which is present in waste water from industries and house holds.

Phosphate may be removed by subjecting the waste water to a biological process comprising Polyphosphate-Accumulating Organisms which under the right conditions accumulate polyphosphate. One desirable feature of Polyphosphate-Accumulating Organisms is that they are capable of consuming large amounts of phosphate when subjected to the right series of conditions. However, Polyphosphate-Accumulating Organisms compete with Glycogen-Accumulating Organisms for the same organic material. This is undesirable in waste water treatment processes, as Glycogen-Accumulating Organisms do not provide the favourable phosphate removing capabilities which are associated with Polyphosphate-Accumulating Organisms. It has been found that the ratio of Glycogen-Accumulating Organisms relative to the total amount of Glycogen-Accumulating Organisms and Polyphosphate-Accumulating Organisms is higher in warmer climates than in colder climates, and thus the challenge in dealing with Glycogen-Accumulating Organisms is especially relevant in warmer climates. Attempts have been made to give Polyphosphate-Accumulating Organisms a competitive advantage, but no successful results have been achieved so far.

Background art may be found in WO 2008/046139 which discloses a biological process for reducing the levels of nitrogen and phosphorous in wastewater, wherein said wastewater comprises at least 100 mg/L total nitrogen wherein said process comprises feeding said wastewater into a reaction vessel in at least two steps, wherein said reaction vessel comprises an active biomass comprising nitrifying and denitrifying organisms and polyphosphate accumulating organisms (PAOs), wherein at least the first feed step is followed by a non-aerated period of sufficient duration to result in sufficiently low concentrations of nitrate and nitrite species in the wastewater to allow for accumulation of polyhydroxyalkanoates in the PAOs, and at least the first non-aerated period is followed by an aerated period of sufficient duration to allow for ammonium oxidation by the nitrifying organisms and assimilation by the PAOs of at least a portion of the phosphorous in the wastewater.

It is an object of one or more embodiments of the present invention, to provide a method which provides the Polyphosphate-Accumulating Organisms with a competitive advantage over Glycogen-Accumulating Organisms.

Moreover, it is an object of one or more embodiments of the present invention, to provide an improved method for removing phosphate in waste water.

DESCRIPTION OF THE INVENTION

In a FIRST aspect, the present invention relates to a method of reducing a ratio of Glycogen-Accumulating Organisms relative to a total amount of Glycogen-Accumulating Organisms and Polyphosphate-Accumulating Organisms in a substance, the method comprising the steps of:
  providing the substance in an anaerobic environment; and
  maintaining the substance in the anaerobic environment at a substance temperature for a first predetermined period of time, until the ratio of Glycogen-Accumulating Organisms is below a predetermined level;
wherein the first predetermined period of time is determined as a function of the substance temperature.

The inventors have surprisingly found that by subjecting a substance comprising both Glycogen-Accumulating Organisms and Polyphosphate-Accumulating Organisms to an anaerobic environment for a first predetermined period of time, the Polyphosphate-Accumulating Organisms will out-compete the Glycogen-Accumulating Organisms such that the level of Glycogen-Accumulating Organisms is reduced drastically. The effect is that the concentration of Polyphosphate-Accumulating Organisms relative to Glycogen-Accumulating Organisms is very high, thus facilitating that a larger amount of the phosphate is removed as is described in further detail below.

It will be appreciated that in most embodiments, the temperature of the substance is not actively changed, i.e. no heating or cooling devices are provided. However it will also be appreciated in some cases the temperature of the substance may change during its flow through the waste water treatment plant e.g. due to an increasing temperature of the surroundings and/or due to change from a cloudy situation to a situation where the sun is shining. It will also be appreciated that the temperature of the substance may drop while the substance is in the waste water treatment plant, e.g. if the air temperature is lower than the incoming flow to the waste water treatment plant.

In the context of the present invention, the term 'Glycogen-Accumulating Organisms' shall also be designated 'GAO', shall refer to any microorganism, such as a heterotrophic microorganism, such as a bacteria, that do not accumulate polyphosphate, but which is able to utilize glycogen as the anaerobic energy source, and compete with PAOs to take up organic matters anaerobically. In one embodiment, the Glycogen-Accumulating Organisms are microorganisms which comprise: Candidatus-Competibacter-phosphatis-related bacteria, alphaproteobacteria and *Defluviicoccus-vanus*-related bacteria.

In the context of the present invention, the term 'Polyphosphate-Accumulating Organisms' shall also be designated 'PAO', shall refer to any chemoheterotroph microorganism, such as a bacteria, that and can exist in both aerobic and anaerobic conditions, such as a microorganism that under aerobic conditions is able to take up orthophosphate from the environment and transform it to polyphosphate, which in turn is reduced to orthophosphate for the purpose of energy generation under anaerobic conditions. In one embodiment, the Polyphosphate-Accumulating Organisms are microorganisms which comprise: Candidatus Accumulibacter phosphatis and related bacteria.

In the context of the present invention, the term 'anaerobic' shall be understood as lack of oxygen, nitrate and nitrite.

In the context of the present invention, the term 'anoxic' shall be understood as lack of oxygen and at the same time a presence of nitrate and/or nitrite.

In the context of the present invention, the term 'aerobic' shall be understood such that dissolved oxygen is available.

In the context of the present invention, the term 'waste water' shall be understood as any water that has been adversely affected in quality by anthropogenic influence. It comprises liquid waste discharged by domestic residences, commercial properties, industry, and/or agriculture and can encompass a wide range of potential contaminants and concentrations.

In the context of the present invention, the term 'untreated waste water' shall be understood as waste water which has not yet entered the waste water treatment system.

In the context of the present invention, the term 'treated waste water' shall be understood as waste water which has entered the waste water treatment plant. Thus, it covers both waste water which is somewhere in the waste water treatment plant and waste water which has been treated in and has left the waste water treatment plant.

In the context of the present invention, the term 'suspended particles' shall be understood as particles which are suspended in the untreated waste water.

In the context of the present invention, the term 'activated sludge' shall be understood as aggregations of suspended solids, micro-organisms and extracellular substances which are present in the treated waste water and which are biologically active.

In the context of the present invention, the term 'substance' shall be understood as a liquid and/or mass containing bacteria and microorganisms. The bacteria and microorganisms may be provided/suspended in the substance or onto a surface provided in the substance. Examples of substances are liquids and/or masses containing waste water and/or having particles suspended therein. Moreover, the term bacteria and/or microorganisms may be provided as a biofilm of particles on a surface.

In the context of the present invention, the term "hydrolysis" shall be understood as the process of breaking down larger organic particles into smaller counterparts. This may be done in the re-circulation anaerobic tank.

In the context of the present invention, the term "substance treatment plant and/or system" shall designate a treatment plant and/or system comprising a substance containing waste water and/or activated sludge and/or biofilms.

It will be appreciated, that the waste water normally enters a main stream which may comprise a screen system, a grit removal system and/or a main primary settling tank and/or a main anoxic tank and/or a main aerobic tanks and/or a main secondary clarifier.

Moreover it will be appreciated that some of the substance may at some point in the main stream (e.g. a point downstream the main aerobic tank) be re-circulated to a point upstream in the main stream (e.g. a point upstream the main aerobic tank).

As part of the re-circulation, the substance may be subjected to a side hydrolysis in which the substance is subjected to anaerobic conditions for the predetermined period of time.

In the context of the present invention, the word 'main' is used as a prefix for any tank/element which is provided in the main stream. Accordingly, the aerobic tank of the main stream is designated the main aerobic tank etc. Moreover, the word 're-circulation' is used as a prefix for any tank, stream or element which is provided in the re-circulation stream. Accordingly, the anaerobic tank of the re-circulation stream of the side hydrolysis is designated the re-circulation anaerobic tank.

With the above prefixes, the waste water may enter a main screen system, and continue into a main grit removal system. Subsequently, the waste water may flow into a main anoxic tank or a main aerobic tank, becoming part of the substance, and thereafter possibly into the main secondary clarification tank. From the main secondary clarification tank (or from the main aerobic tank), a part of the substance may be re-circulated. The re-circulated substance may be re-circulated into the main anoxic tank. However prior to this, a part of the re-circulated substance may be subjected to anaerobic conditions in the re-circulation anaerobic tank.

The abovementioned main stream and re-circulation stream is one example of the configuration of such streams. Further examples are described in relation to the figures. However, the skilled person will readily realize that even further examples and configurations exist. However, the present invention shall not be limited to the described configurations of the main stream and re-circulation stream.

The process described in the previous and the following paragraphs may be a continuous process.

PAO are responsible for removal of phosphorus in Enhanced biological phosphorus removal plants (EBPR plants). PAO are able to take up large amounts of organic matter (e.g. acetate) under anaerobic conditions and to convert this to the storage polymer PHA. Energy for this emanates from hydrolysis of polyphosphate (polyP) contained inside the PAO into extracellular phosphate and from degradation of intracellular glycogen.

Under subsequent aerobic conditions (e.g. in the main aerobic tank such as a nitrification tank), PAO uses the stored polymer PHA for growth and for accumulation of even larger amounts of phosphorus in the organisms in the form of polyP.

In some embodiments, an anoxic tank is provided immediately before the aerobic tank. The purpose of the anoxic tank is de-nitrification of the substance i.e.:

$$NO_3^- \rightarrow N_2.$$

Similarly, the purpose of the aerobic tank is nitrification i.e.

$$NH_4^+ + O_2 \rightarrow NO_3^-.$$

Typically the substance in the anoxic tank is not aerated, but a mixing device may be provided to keep the activated sludge of the substance in suspension.

When the substance is re-circulated to a point upstream the aerobic and/or the anoxic phase, the process is repeated again.

In one embodiment, the substance may be subjected to anaerobic conditions more than once i.e. in the re-circulation anaerobic tank and in a main anaerobic tank provided before the anoxic tank and/or the aerobic tank. However, it will be appreciated that the main anaerobic tank may not be provided in most embodiments, whereby only the re-circulation anaerobic tank may be provided in the waste water treatment plant.

In order to remove the phosphorus from the substance, at least a part of the polyP containing PAO is harvested. This is typically done at some point after the main aerobic tank (as the PAO take up the most phosphorus in the aerobic phase) and prior to a subsequent anaerobic phase. Accordingly, the harvesting may advantageously be done at some point in the re-circulation process i.e. while the substance is re-circulated from some point in the main stream (e.g. the main aerobic tank or the main secondary clarifier) to some point prior to any of the re-circulation anaerobic tank and the main anoxic tank.

As a supplement for the removed polyP containing PAO, new waste water may be added in the main stream typically from the waste water entering the main anoxic tank from the main screen and grit removal system.

According to the method of the first aspect of the invention, part of the substance is subjected to the anaerobic conditions for the first predetermined period of time so as to ensure the ratio of GAO is below the predetermined level. In one embodiment, the substance is subjected to the entire first predetermined period of time in the re-circulation anaerobic tank. In another embodiment, the substance is subjected to anaerobic conditions such that a first part of the predetermined period takes place in the re-circulation anaerobic tank while a second part of the predetermined period takes place in the possibly provided main anaerobic tank.

As mentioned previously, GAO are often present in the treatment plants along side with PAO. Contrary to PAO, GAO do not accumulate phosphorus, but compete for the same organic matter as PAO. It will thus be appreciated that the effectiveness of the phosphorus removing process is highly dependent on the level/ratio of GAO. The lower the ratio is, the better is the phosphorus removing process.

Accordingly, the present invention provides a method which enhances the phosphorus removal process, as subjection of part of the substance to anaerobic conditions for at least the predetermined period of time significantly reduces the level of GAO. It is stressed that by subjecting the substance or a part thereof to anaerobic conditions, the GAO are not killed but merely out-competed by the PAO which are more easily metabolic active under the anaerobic conditions than GAO.

In the context of the present invention, the term 'ratio of Glycogen-Accumulating Organisms relative to a total amount of Glycogen-Accumulating Organisms and Polyphosphate-Accumulating Organisms in a substance' shall be understood such that the lower the ratio is, the smaller the percentage of the GAO in the substance is relative to the total (combined) amount of GAO and PAO in the same substance. Accordingly, the ratio may be described with the following formula:

$$\text{Ratio} = \frac{GAO}{GAO + PAO}$$

In the context of the present invention the term 'ratio' shall be used as an abbreviation for 'the ratio of Glycogen-Accumulating Organisms in the substance relative to a total amount of Glycogen-Accumulating Organisms and Polyphosphate-Accumulating Organisms in the substance'.

It will be appreciated that other bacteria and organisms will also be present in the substance. However for simplicity reasons, these other bacteria are not discussed.

As the GAO and the PAO compete for the same recourses, it is desirable that the ratio (level) is as low as possible, as this increases the amount of phosphorus which is bound by the PAO in the aerobic stage of the treatment process. In order to out-compete the GAO in the substance, the substance is subjected to an anaerobic environment for the predetermined period of time.

In a one embodiment, the method is performed as a batch process where the substance is moved into a separate tank which is used for different steps of the process. In a first step, no air is added to the substance whereby the tank serves as a main anoxic tank. Subsequently, the substance is aerated thus causing the separate tank to function as a main aerobic tank. In yet another step, the activated sludge in the substance is allowed to sedimentate by gravity.

In both the abovementioned batch process and the previously mentioned continuous process, a part of the substance may be re-circulated. This may be done by leading a part of the substance from the main secondary clarifier (or from the main aerobic tank) into the re-circulation stream.

It will be appreciated that the activated sludge contained in the substance will settle in the main secondary clarifier and thus by providing the outlet which is connected to the re-circulation stream in the lower part of the main secondary clarifier, the concentration of the solid particles will be high in the re-circulated substance. In one embodiment, the concentration of solid particles is in the range 0.1 to 5 percent, such as 0.5 to 3 percent, such as 0.8 to 2.0 percent, such as 1 percent.

In one embodiment, between 0 and 100 percent of the substance flowing into the waste water treatment plant is re-circulated, such as between 30 and 70 percent, such as 50 percent.

Of this re-circulated substance, a first part is directed directly into the main stream at a point upstream the aerobic tank while a second part is directed into the re-circulation anaerobic tank. This second part may constitute between 0 and 50 percent of the re-circulated substance, such as between 5 and 30 percent, such as between 10 and 20 percent.

In one embodiment, the dry solids content of the re-circulated substance is unchanged from the point where the re-circulated substance leaves the main stream to the point where it enters the re-circulation anaerobic tank. In other embodiments, the dry solids content is increased prior to the substance entering the re-circulation anaerobic tank. This may be done in a de-watering device or a static thickener. By increasing the dry solids content, the size of the re-circulation anaerobic tank may be reduced, which may be desirable from an economic and a space-saving point of view. In one embodiment, the dry solids content is increased by 200 percent, such as by 300 percent, such as by 400 percent, such as 500 percent, such by 600 percent, such as by 700 percent, such as by 800 percent, such as by 900 percent, such as by 1000 percent.

In one embodiment, the dry solids content in the substance entering the re-circulation anaerobic tank is at least 1 percent, such as at least 2 percent, such as at least 3 percent, such as at least 4 percent, such as at least 5 percent.

The substance (in this context the re-circulated substance) is subjected to the anaerobic environment for a predetermined period of time, until the percentage of GAO is below a pre-determined level. A part of this predetermined period of time may take place in the device for thickening the substance (e.g. the de-watering device or a static thickener).

The inventors have made the surprising discovery that this predetermined period of time is dependent on the temperature of the substance. Thus the colder the temperature of the substance is, the longer the predetermined period of time i.e. the longer it takes before the ratio of GAO is below the predetermined level. Similarly, the warmer the substance is the shorter the predetermined period is.

In one embodiment, the method further comprises the steps of:
determining the substance temperature, and
determining the first predetermined period of time on the basis of the substance temperature, such that the first predetermined period of time corresponds to the ratio (of Glycogen-Accumulating Organisms in the substance relative to a total amount of Glycogen-Accumulating Organisms and Polyphosphate-Accumulating Organisms in the substance) being below the predetermined level when the substance is maintained in the anaerobic environment for the first predetermined period of time at the substance temperature.

During the first predetermined period of time, the substance temperature may be within +/−1% of the determined substance temperature, such as within +/−5%, such as within +/−10%, such as +/−20%.

The temperature may be determined manually by means of a thermometer. Alternatively, the process may be automated such that a temperature is determined automatically. In one embodiment, the temperature is determined concurrently, and the first predetermined period of time is also determined concurrently.

The first predetermined period of time may be determined by means of a table containing different values of the substance temperature relative and their corresponding first periods of time. Alternatively, or as a supplement, the first predetermined period of time may be determined by means of a graph in which one axis corresponds to the substance temperature and the other axis corresponds to the first predetermined period of time, i.e. a graph wherein the first predetermined period of time is illustrated as a function of the determined substance temperature. Alternatively, or as a supplement, the first predetermined period of time may be calculated.

In one embodiment, the method may comprise the step of:
determining an average temperature corresponding to the average temperature over a predetermined historic period of time, and
determining the first predetermined period of time based on the average temperature.

In one embodiment, the first predetermined period of time is above 6 hours, such as above 9 hours, such as above 12 hours, such as above 15 hours, such as above 18 hours, such as above 21 hours, such as above 24 hours, such as above 30 hours, such as above 36 hours, such as above 42 hours, such as above 48 hours, such as above 60 hours, such as above 72 hours, such as above 96 hours.

In one embodiment, the predetermined historic period of time is above 6 hours, such as above 9 hours, such as above 12 hours, such as above 15 hours, such as above 18 hours, such as above 21 hours, such as above 24 hours, such as above 30 hours, such as above 36 hours, such as above 42 hours, such as above 48 hours, such as above 60 hours, such as above 72 hours, such as above 96 hours, such as 5 days, such as 6 days, such as 7 days.

In one embodiment, the method further comprises the step of: determining the predetermined period of time on the basis of the substance temperature. The latter step may be performed prior to subjecting the substance to the anaerobic conditions. Alternatively, the predetermined period is calculated while the substance is subjected to the anaerobic conditions.

As described previously, the effective consummation of phosphate requires that the substance is subjected to oxygen and/or nitrate and/or nitrite after the anaerobic process step. Thus in one embodiment, the method further comprises the step of: subsequently subjecting the substance to anoxic or aerobic environment. This may be done in the same tank (typically in the batch process case) or by moving/pumping/leading the substance from the re-circulation anaerobic tank to a main anoxic/aerobic tank. In the main aerobic tank, means for aerating the substance may be provided. One example of such means is means for blowing air into the substance below the surface of the substance.

In one embodiment, the method comprises the step of:
subjecting the substance to an aerobic environment for a second predetermined period of time.

In one embodiment, the second predetermined period of time is in the range 1-24 hours. In some embodiments the second predetermined period of time is below one hour such as 30 minutes.

As mentioned previously, a part of the substance may be re-circulated from the main aerobic tank to the main anaerobic tank (e.g. via the re-circulation anaerobic tank). The method may further comprise the step of:
re-circulating at least a part of the substance to the anaerobic environment.

In one embodiment, the predetermined level of Glycogen-Accumulating Organisms is below 50 percent, such as below 40 percent, such as below 30 percent, such as below 20 percent, such as below 10 percent, such as below 5 percent, such as below 4 percent, such as below 3 percent, such as below 2 percent such as below 1 percent.

As previously mentioned, the first predetermined period of time may decrease with an increasing temperature.

This relationship is described by the following equation set:

$$(\text{IF } (5° \text{ C.} \leq T_c \leq 20° \text{ C.}) \text{ THEN } (18 \text{ h} \leq t_{AN} \leq 48 \text{ h}))$$

OR $$(\text{IF } (15° \text{ C.} \leq T_c \leq 30° \text{ C.}) \text{ THEN } (12 \text{ h} \leq t_{AN} \leq 36 \text{ h}))$$

OR $$(\text{IF } (25° \text{ C.} \leq T_c \leq 35° \text{ C.}) \text{ THEN } (10 \text{ h} \leq t_{AN} \leq 30 \text{ h}))$$

where $T_c$ is the temperature of the substance and $t_{AN}$ the duration of the predetermined period of time Accordingly, in one embodiment, the first predetermined period of time is in the range 18-48 hours when the substance temperature is in the range 5-20 degrees Celsius. In one embodiment, the first predetermined period of time is above 18 hours when the temperature is in the range 5-20 degrees Celsius. In one embodiment, the first predetermined period of time is below 48 hours when the temperature is in the range 5-20 degrees Celsius.

In one embodiment, the first predetermined period of time is in the range 12-36 hours when the substance temperature is in the range 15-30 degrees Celsius. In one embodiment, the first predetermined period of time is above 12 hours when the temperature is in the range 15-30 degrees Celsius. In one embodiment, the first predetermined period of time is below 36 hours when the temperature is in the range 15-30 degrees Celsius.

In one embodiment, the first predetermined period of time is in the range 10-30 hours when the substance temperature is in the range 25-35 degrees Celsius. In one embodiment, the first predetermined period of time is above 10 hours when the temperature is in the range 25-35 degrees Celsius. In one embodiment, the first predetermined period of time is below 30 hours when the temperature is in the range 25-35 degrees Celsius.

In a SECOND aspect, the present invention relates to a method for removal of phosphate from a substance containing waste water and/or activated sludge by use of the method according to the first aspect of the invention.

In a THIRD aspect, the present invention relates to a waste water and/or substance treatment plant and/or system for reducing a ratio of Glycogen-Accumulating Organisms in a substance (containing waste water and/or activated sludge) and/or waste water relative to a total amount of Glycogen-Accumulating Organisms and Polyphosphate-Accumulating Organisms in the substance and/or waste water, the waste water and/or substance treatment plant and/or system comprising:
an anaerobic compartment for accommodating the substance and/or waste water during treatment; and
a controller for (or adapted to) performing the method according to the first aspect of the invention.

In one embodiment, the controller is programmed to perform the method according to the first aspect of the invention.

In a FOURTH aspect, the present invention relates to a controller for (or adapted to) controlling a waste water and/or substance treatment plant and/or system in accordance with the method according to the first aspect of the invention.

In one embodiment, the controller is programmed to perform the method according to the first aspect of the invention.

In a FIFTH aspect, the present invention relates to the use of the method according the first aspect of the invention to control a waste water and/or substance treatment plant and/or system.

BRIEF DESCRIPTION OF THE FIGURE

The invention will now be described with reference to the figures in which.

DETAILED DESCRIPTION OF THE FIGURES

Figure 1:
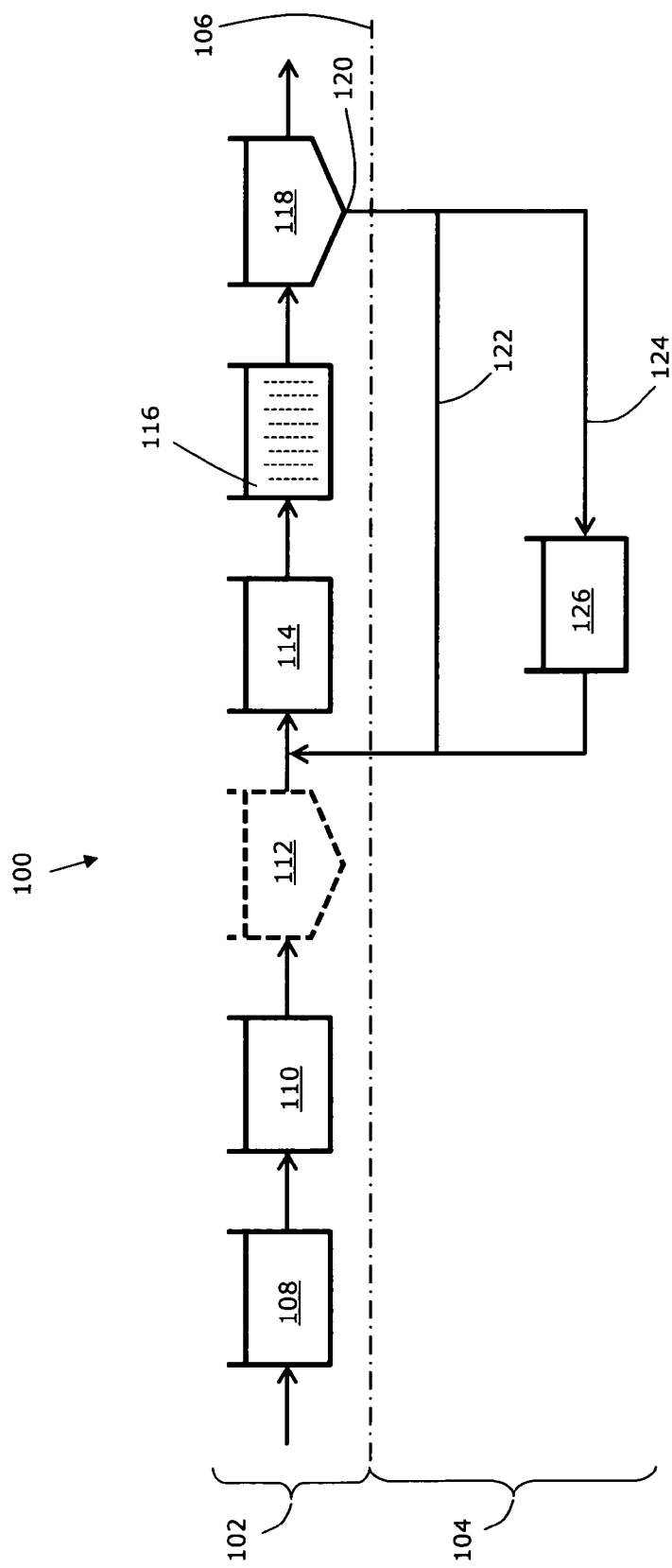
FIG. 1 discloses a first embodiment of the invention.
Figure 2:
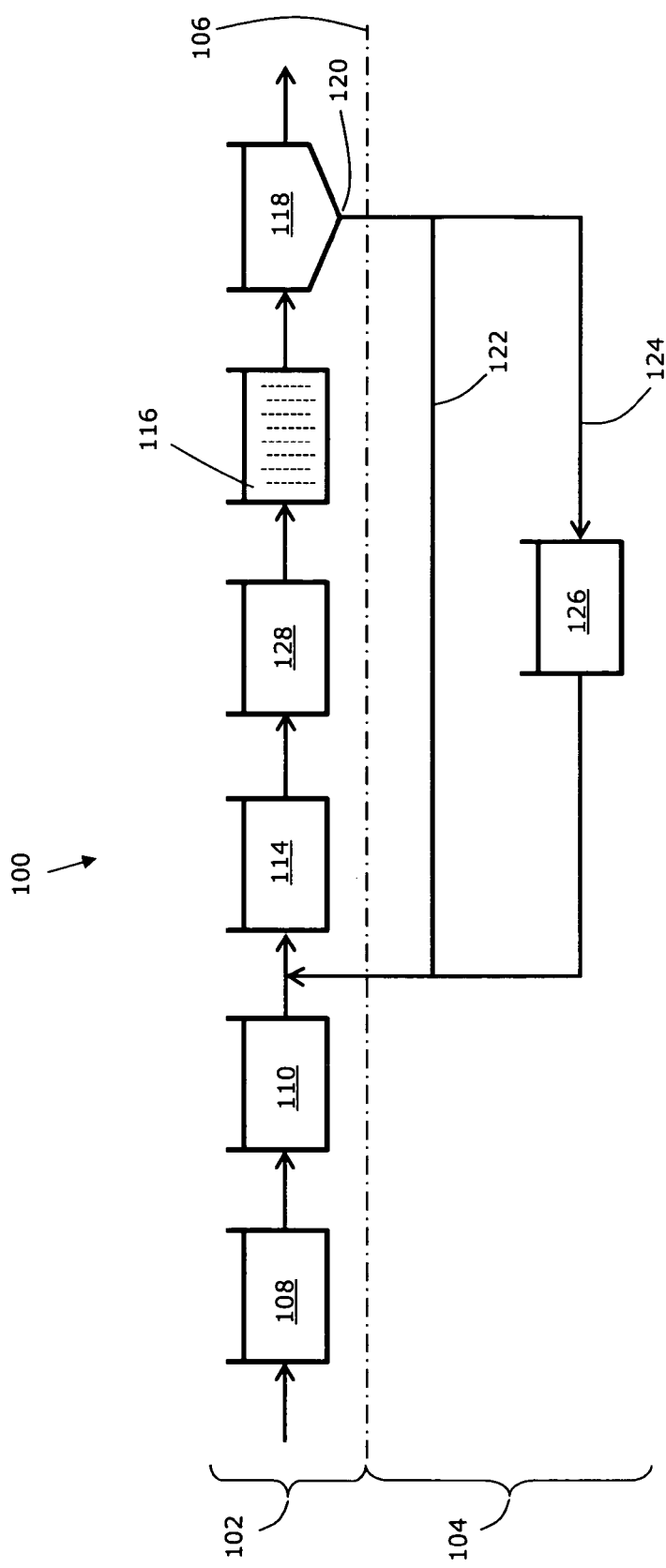
FIG. 2 discloses a second embodiment of the invention.

In the following, FIGS. 1 and 2 are described. However, it will be appreciated that these two figures only describes two possible embodiments of main streams and re-circulation streams, and a large number of alternatives exist. Thus, the present invention shall not be limited to these two embodiments of the main stream and the re-circulation stream.

FIGS. 1 and 2 disclose two different embodiments of the present invention. The differences are described in further detail below. It will be appreciated that the principles of the two figures may be combined in any way.

FIG. 1 discloses a waste water treatment plant 100 defining a main stream 102 and a re-circulation stream 104. In the figures, the main stream 102 is provided above the dash-dotted line 106 while the re-circulation stream is provided below the dash-dotted line 106.

The main stream 102 comprises a plurality of tanks which the waste water and/or the substance successively passes through as is described below. A part of the substance is re-circulated by means of the re-circulation stream 104 such that the re-circulated substance flows into the main stream 102 at a point upstream relative to where the substance leaves the main stream 102 to enter into the re-circulation stream 104.

Initially, the untreated waste water flows into a main screen system 108 which is adapted to remove larger objects. Subsequently, the waste water flows into a grit removal system 110 in which sand and gravel over a certain size sedimentate.

In some embodiments of the waste water treatment plant 100, a main primary settling tank 112 is provided in which the heavier waste water particles are allowed to settle such that they are separated from the liquid phase of the waste water. However it will be appreciated that the main primary settling tank is not present in some embodiments, and thus the main primary settling tank 112 is indicated by means of a dotted line.

The next step in main stream 102 of the waste water treatment plant 100 is the main contact tank 114 (also called the selector tank) in which the waste water from the main stream and the substance from the re-circulation stream are mixed and the waste water becomes part of the substance.

Subsequently, the substance flows into a main aerobic tank 116, in which the substance is aerated such that it is subjected to oxygen.

The next step in the process is the main secondary clarifier 118 in which activated sludge is allowed to settle. In the embodiment of the figures, the main secondary clarifier 118 comprises a re-circulation outlet 120 which is arranged such that this settled activated sludge is used for re-circulation. Accordingly, the dry solids content of substance entering the re-circulation stream is higher than the dry solids content of the clarified treated waste water which leaves the main secondary clarifier.

A part of the re-circulated substance flows directly back to the main contact tank 114 via a re-circulation direct line 122, while another part of the re-circulated substance flows via a side stream line 124 into a re-circulation anaerobic tank 126, which may also be designated the side stream hydrolysis tank.

In the re-circulation anaerobic tank 126, the substance is subjected to anaerobic conditions for a first predetermined period of time which is determined by the substance temperature. This is described in further detail in relation to FIG. 3. By subjecting the substance to the anaerobic conditions for a first predetermined period of time, the ratio of GAO drops such that the percentage of GAO in relation to the sum of GAO and PAO is small, such as below 10 percent. This is desirable as PAO contrary to GAO are desirable when phosphor is to be removed as is described in further detail above.

FIG. 2 differs from FIG. 1 in that no main primary settling tank 112 is disclosed. It will be appreciated from the above description of FIG. 1 that this main primary settling 112 is described as optional. Moreover, FIG. 2 differs from FIG. 1 in that an anoxic tank 128 is interposed between the main contact tank 114 and the main aerobic tank 116. Except from these two differences, the two figures are identical and identical reference numbers relate to identical elements.

During use of the waste water treatment plant 100 of FIG. 2, substance flows from the main contact tank 114 to the anoxic tank 128. After treatment in the anoxic tank 128, the substance flows from the anoxic tank 128 to the aerobic tank 116.

Figure 3:
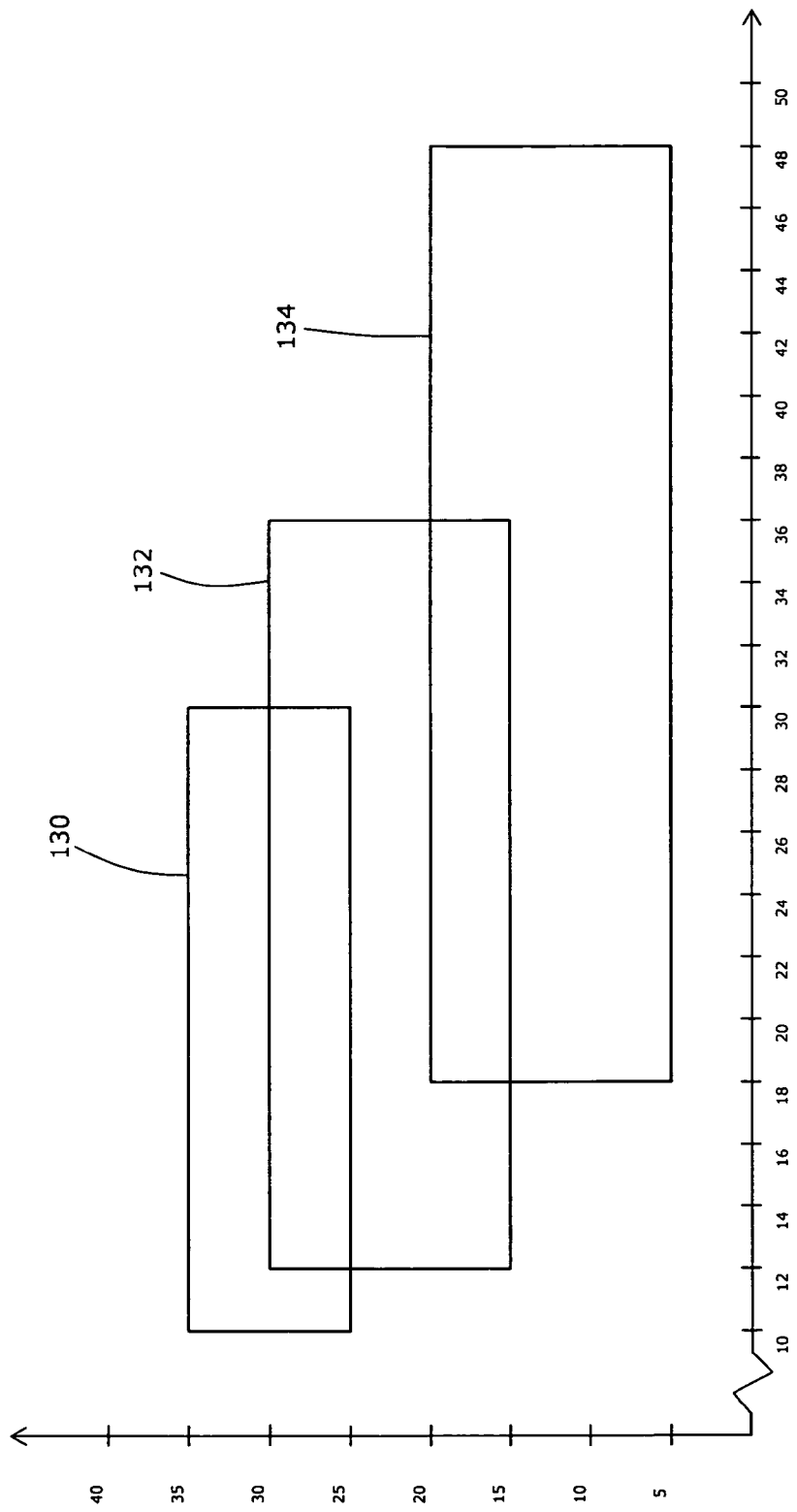
FIG. 3 discloses the relation between the predetermined period and the substance temperature when designing and controlling the flow to a re-circulation anaerobic tank according to the method according to the present invention.

FIG. 3 discloses one way of controlling the re-circulation anaerobic tank 126, by determining the predetermined period of time in response to the temperature of the substance contained in the re-circulation anaerobic tank 126. In FIG. 3 the horizontal axis designates the number of hours which the substance is subjected to the anaerobic conditions and the vertical axis the temperature of the substance.

In one embodiment, the substance is maintained 10 to 30 hours in the re-circulation anaerobic tank, when the temperature of the substance in said tank is in the range 25 to 35 degrees Celsius. This is illustrated by the high temperature box 130.

In another embodiment, the substance is maintained 12 to 36 hours in the re-circulation anaerobic tank, when the temperature of the substance in said tank is in the range 15 to 30 degrees Celsius. This is illustrated by the medium temperature box 132.

In yet another embodiment, the substance is maintained 18 to 48 hours in the re-circulation anaerobic tank, when the temperature of the substance in said tank in the range 5 to 20 degrees Celsius. This is illustrated by low temperature box 134.

It will be appreciated that the abovementioned three embodiments may be combined in any way. As an example, in one method according to the invention all three embodiments are used at the same time.

In one embodiment, the period of time which the substance is subjected to the anaerobic conditions of the re-circulation anaerobic tank 126 is determined by a function where the temperature of the substance in the re-circulation anaerobic tank 126 determines the period of time which the substance is subjected to anaerobic conditions. In one embodiment, this function is a linear function. In another embodiment, the function is a polynomial such as a second degree polynomial. The aforementioned functions may pass through the high, medium and low temperature boxes 130,132,134.

EXAMPLE

Experiments have been carried out to determine if prolonged anaerobic storage affected Accumulibacter (PAO) and Competibacter (GAO) differently. Samples were taken from the prolonged anaerobic storage incubations at 12 h intervals, incubated with $^{14}C$-labeled acetate for 2 h under anaerobic conditions and the radioactivity incorporated into the different populations indicating active substrate uptake was observed with MAR-FISH—see the below table. Accumulibacter (PAO) cells were MAR-positive even after 7 days indicating that they maintained the ability to consume acetate even after long periods of anaerobic incubation. Competibacter (GAO) were MAR-positive at the start of the anaerobic storage (time 0) but already after 12 h acetate uptake had all but few stopped—see the below table. This showed that Competibacter (GAO) were able to uptake external substrate only approx. 12 h after initiation of anaerobic conditions in contrast to Accumulibacter (PAO) that still were able to do it after 7 days.

TABLE 1

Anaerobic consumption of labeled acetate after different durations of anaerobic incubation without external substrate addition as determined by MAR-FISH.

| time (days) | Accumulibacter | Competibacter |
|---|---|---|
| 0 | + | + |
| ½ | + | +/− |
| 1 | + | − |
| 1½ | + | − |
| 2 | + | − |
| 2½ | + | − |
| 3 | + | − |
| 4 | + | − |
| 7 | + | − |

Assays

During the making of the above example, presence of PAO and GAO was tested by means of one or more of the following assays (which may be used in connection with the present invention):

Fluorescence in situ hybridization (FISH) and FISH quantification was performed according to Nielsen et al. (2009) with a limit of quantification set at 0.25%. The oligonucleotide probes EUBmix (equimolar EUB338 I, II & II) targeting most bacteria (Amann et al., 1990, Appl. Environ. Microbiol. 56:1919-1925; Daims et al., 1999, Syst Appl Microbiol 22: 434-444.), PAOmix (equimolar PA0462, PA0651 and PA0846) targeting "Candidatus Accumulibacter phosphatis" (Crocetti et al., 2000. Appl. Environ. Microbiol. 66:1175-1182), GAOmix (equimolar GAOQ989 (Crocetti et al., 2002. Microbiology 148, 3353-3364.) and GB_g2 (Kong et al., 2002, Environmental Microbiology 4 (11), pp. 753-757) targeting "Candidatus Competibacter phosphatis".

Microautoradiography (MAR-FISH) may be performed as described by Nielsen & Nielsen (2005). Briefly, 2 mL of sludge was flushed with $O_2$-free $N_2$ in 9 mL serum bottles (to achieve anaerobic conditions), then incubated with 120 mg $L^{-1}$ (2 mM) of either radiolabeled or unlabeled acetate. After incubation the sludge was fixed by addition of 96% ethanol then applied to two gelatin-coated cover glasses (24 by 60 mm) and gently homogenized by rubbing them together. Subsequently, FISH probing, coating with emulsion, exposure, development and microscopy were carried out. Each MAR experiment was made in triplicate and negative controls for non-radioactively induced signal included.

Staining for intracellular polyhydroxyalkanoates (PHA) was made with Nile Blue staining (Nielsen et al., 2009a). FISH was performed first followed by chemical staining and relocation of the same microscopic field.

REFERENCES

Nielsen, J. L. and P. H. Nielsen (2005): Advances in microscopy: Microautoradiography of single cells. In Methods in Enzymology, (Ed. J. R. Leadbetter), Academic Press, San Diego, Vol. 397: 237-256.

Nielsen, J. L., Kragelund, C., and P. H. Nielsen (2009a): Combination of Fluorescence in situ Hybridization with staining techniques for cell viability and accumulation of PHA and polyP in complex microbial systems. Chapter 7 (p. 103-116) in "Bioremediation, Methods in Molecular Biology" (Ed. S. Gummings). The Humana Press Inc., New Jersey.

Nielsen, P. H., Lemmer, H. and H. Daims (2009b): FISH Handbook of Wastewater Treatment. IWA publishing, London U.K.

The invention claimed is:

1. A method of reducing a ratio of Glycogen-Accumulating Organisms relative to a total amount of Glycogen-Accumulating Organisms and Polyphosphate-Accumulating Organisms in a substance comprising waste water and/or activated sludge, the method comprising the steps of:
    providing the substance in an anaerobic environment;
    determining the substance temperature;
    determining a predetermined level of the ratio of Glycogen-Accumulating Organisms relative to a total amount of Glycogen-Accumulating Organisms and Polyphosphate-Accumulating Organisms in the substance;
    providing a controller adapted to control the reduction of Glycogen-Accumulating Organisms relative to the total amount of Glycogen-Accumulating Organisms and Polyphosphate-Accumulating Organisms;
    determining by use of the controller a first predetermined period of time as a function of the substance temperature such that the first predetermined period of time corresponds to the ratio being below the predetermined level; and
    controlling the reduction by maintaining the substance in the anaerobic environment at the substance temperature for the first predetermined period of time, until the ratio of Glycogen-Accumulating Organisms relative to a total amount of Glycogen-Accumulating Organisms and Polyphosphate-Accumulating Organisms in the substance, is below the predetermined level.

2. A method according to claim 1, wherein the first predetermined period of time is above 10 hours.

3. A method according to claim 1, wherein the ratio of Glycogen-Accumulating Organisms relative to a total amount of Glycogen-Accumulating Organisms and Polyphosphate-Accumulating Organisms in a substance is below 10 percent.

4. A method according to claim 1, further comprising the step of:
    subsequently subjecting the substance to an anoxic and/or an aerobic environment.

5. A method according to claim 1, further comprising the step of:
    subjecting the substance to an aerobic environment for a second predetermined period of time.

6. A method according to claim 1, further comprising the step of:
    re-circulating at least a part of the substance to the anaerobic environment.

7. A method according to claim 1, further comprising the step of:
    increasing the dry solids content prior to the step of re-circulating.

8. A method according to claim 1, wherein the first predetermined period of time decreases with an increasing temperature.

9. A method according to claim 1, wherein the first predetermined period of time is in the range 18-48 hours, when the substance temperature is in the range 5-20 degrees Celsius.

10. A method according to claim 1, wherein the first predetermined period of time is in the range 12-36, hours when the substance temperature is in the range 15-30 degrees Celsius.

11. A method according to claim 1, wherein the first predetermined period of time is in the range 10-30 hours, when the substance temperature is in the range 25-35 degrees Celsius.

12. A method according to claim 1, wherein the Glycogen-Accumulating Organisms comprises: Candidatus-Competibacter-phosphatis-related bacteria and *Defluviicoccus-vanus*-related bacteria.

13. A method according to claim 1, wherein the Polyphosphate-Accumulating Organisms comprises Candidatus Accumulibacter phosphatis related bacteria.

14. A substance treatment system for reducing a ratio of Glycogen-Accumulating Organisms relative to a total amount of Glycogen-Accumulating Organisms and Polyphosphate-Accumulating Organisms in a substance containing waste water and/or activated sludge, the substance treatment plant and/or system comprising:
    an anaerobic compartment for accommodating the substance in an anaerobic environment during treatment; and
    a controller having a predetermined level of Glycogen-Accumulating Organisms relative to a total amount of Glycogen-Accumulating Organisms and Polyphosphate-Accumulating Organisms and being adapted to determine a temperature of the substance; and to calculate a first predetermined period of time as a function of the substance temperature; the controller further being adapted to maintain the substance in the anaerobic environment at a substance temperature for the first predetermined period of time, until the ratio of Glycogen-Accumulating Organisms relative to a total amount of Glycogen-Accumulating Organisms and Polyphosphate-Accumulating Organisms in the substance, is below the predetermined level.

* * * * *